United States Patent
Croullebois

[11] 3,894,648
[45] July 15, 1975

[54] MULTIPURPOSE DROPPING CONTAINER

[75] Inventor: Georges Croullebois, Paris, France

[73] Assignee: Etat Francais, France

[22] Filed: Nov. 20, 1973

[21] Appl. No.: 417,619

[30] Foreign Application Priority Data
Nov. 23, 1972 France .................. 72.41586

[52] U.S. Cl. .............. 220/4 F; 9/10; 244/138 R; 292/40; 292/256.6; 292/258
[51] Int. Cl. ........................................... B65d 7/32
[58] Field of Search ............ 244/136, 137 R, 138 R, 244/138 A, 147, 148, 149; 9/9, 10, 11 A, 14, 317, 318; 292/256.6, 258, 40; 85/61; 285/2; 220/22.3, 23, 71, 4 R, 4 B, 4 E, 4 F

[56] References Cited
UNITED STATES PATENTS

| | | | |
|---|---|---|---|
| 986,074 | 3/1911 | Madsen et al. ............... | 292/40 |
| 1,777,188 | 9/1930 | Wiley ........................ | 244/138 R |
| 2,165,656 | 7/1939 | Ryan .......................... | 285/2 |
| 2,345,616 | 4/1944 | Manson et al. ............... | 244/138 R |
| 2,372,981 | 4/1945 | Quilter ....................... | 244/138 R |
| 2,501,559 | 3/1950 | Winzen et al. ............... | 244/138 R |
| 2,565,470 | 8/1951 | Brown ........................ | 244/138 R |
| 2,587,448 | 2/1952 | Eakin ......................... | 244/138 R |
| 2,752,615 | 7/1956 | Parker ........................ | 9/9 |
| 3,071,787 | 1/1963 | Burker ........................ | 9/318 |
| 3,799,097 | 3/1974 | Robertson ................... | 114/206 R |

FOREIGN PATENTS OR APPLICATIONS

902,162  7/1962  United Kingdom ............ 9/11 A

Primary Examiner—Duane A. Reger
Assistant Examiner—Galen L. Barefoot
Attorney, Agent, or Firm—Carson, Taylor and Hinds

[57] ABSTRACT

A recoverable container for dropping of equipment from an aircraft or ship. The container is made up of a body which is made from rigid material and composed of two half shells assembled by removable fasteners, with a bottom solid with one of the half shells and a hollow cover hermetically engaging inside the body and connected to at least one of the half shells, at least one of the half shells being provided with an opening closed by a plug.

1 Claim, 6 Drawing Figures

FIG. 5
FIG. 6
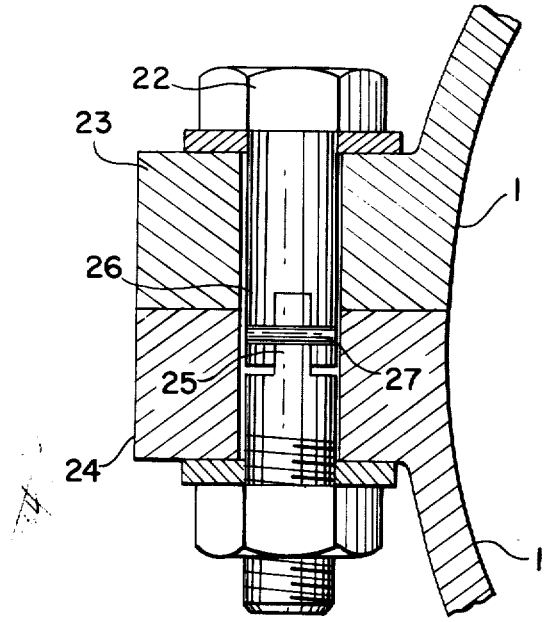
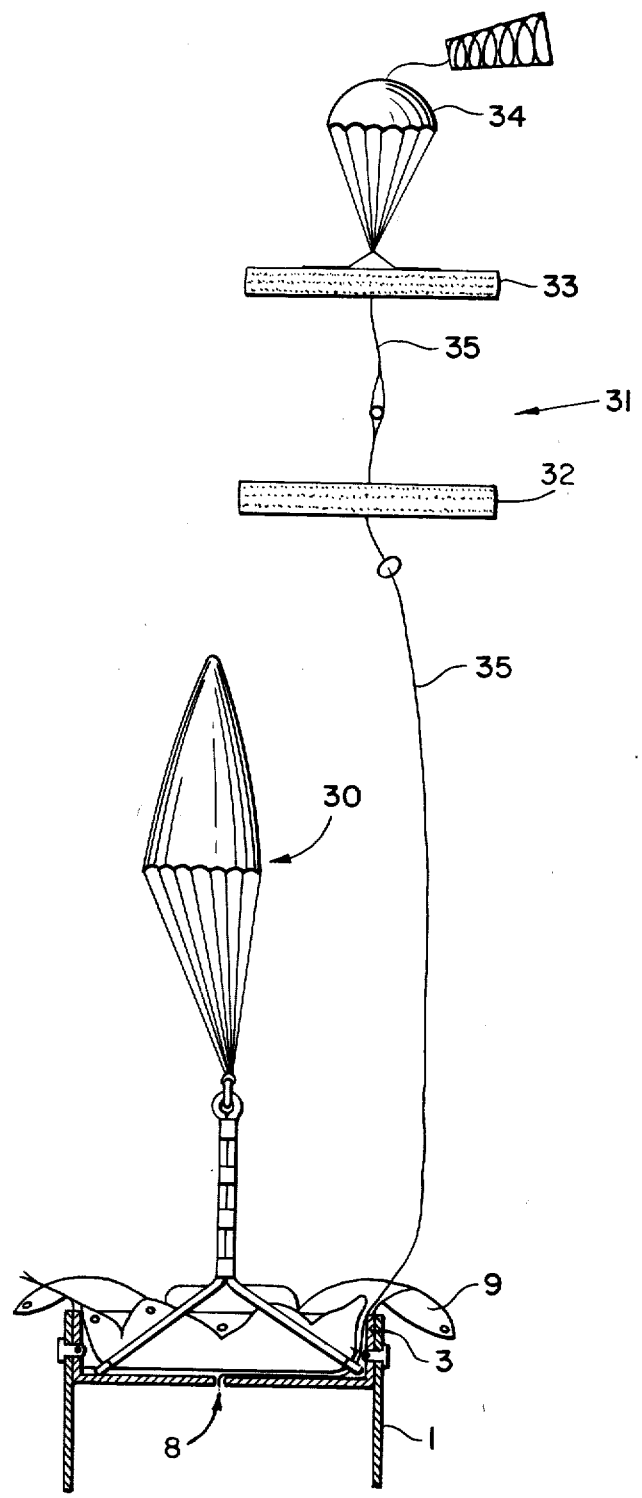

MULTIPURPOSE DROPPING CONTAINER

The present invention relates to a container for dropping equipment from an aircraft or a ship.

Known containers of this type are divided into distinct categories depending on their uses. Most often, they are of rudimentary fabrication and structure. These containers are not multipurpose nor reusable. A fortiori, containers having both these advantageous properties are unknown so far. Further, containers now in use do not permit the transfer of equipment by sea from one ship to another, and are not equipped for the recovery at sea of the container with a diverter float system including a diverter wire and float. Recovery of the container by ship requires maneuvering the ship into position, stopping the ship, then putting a boat to sea.

The present invention alleviates the above-mentioned drawbacks and aims at replacing the ensemble of containers which up to now permitted either the dropping or transfer of equipment, for example, a pneumatic lifeboat, by a simple and tough device, of standard type, with multiple uses, reusable many times, quickly adaptable to each particular application, and able to be equipped with a system allowing recovery at sea of the device by a ship towing a float.

The invention therefore has for its object a recoverable container for dropping of equipment from an aircraft or ship, characterized in that it is made up of a body which is made from a rigid material and which is composed of two half shells assembled by removable fastening means. The bottom is solid with one of the half shells and a hollow cover hermetically engages inside of said body and is connected by linking means to one at least of the half shells, at least one of the half shells being provided with an opening closed by a plug.

Another object of the invention is a container as described above, characterized further in that the linking means are maneuverable on the outside and are compatible with disassembly of the half shells at the time of breaking of the means of fastening the half shells together.

The invention also has for its object a container as described above, characterized further in that the hollow cover delimits a space closed by a lower face, an upper face and a side wall for housing of means for dropping the container such as a parachute, the lower face presenting an orifice permitting the passage of a line which floats in water, such as a polypropylene line, the upper face presenting at least a removable part so as to permit the release of the dropping means and the inside part of the side wall comprising hook means permitting the container to be connected to the dropping means. The upper face of the cover can be made up of petals of a flexible material, each provided at their end with an eyelet permitting their assembly by a pin intended to be pulled out at the time of dropping.

The invention also has for its object a container as above further characterized by the fact that the shell connecting means are made up of two pins each placed in an orifice going through the side wall of each of the half shells and the side wall of the cover, each solid with a fork articulated around a shaft going respectively through the end of each pin, the ends of the two arms of each fork being both placed under a stirrup solid with the corresponding half shell and each of the handles of each of the forks being held between the cheeks of a yoke which is also solid with the corresponding half shell by a safety pin provided with an extraction chain one of whose ends is fastened to the end of the handle and the other end of a "U" link solid with the corresponding half shell.

Additionally, the invention has for its object a container as described above further characterized in that the bottom of the container is reinforced by ribs to act as a shield at the time of impact and resist the forces of inertia that are transmitted to it by a removable partition on which the load rests, the space between the shield and removable partition constituting a housing.

In an embodiment of the container according to the invention, the plug blocking the hole made in one at least of the half shells is permeable to a liquid tripping means for inflation of a pneumatic device, such as a pneumatic lifeboat, contained inside of said container. The means of fastening the two half shells can then be breakable pin gudgeons which, giving away under the action of a pressure transmitted to the inside wall of the half shells by the inflation of the pneumatic device, permit the automatic dissasembly of the half shells.

In another embodiment of the container according to the invention, the means of fastening the half shells are standard bolts, the plug hermetically sealing the opening.

Finally, according to the invention, the cover of the container can serve for the housing of recovery means or a line which floats in water.

The invention is detailed in the following non-limiting description of an embodiment, with reference to the accompanying drawings, wherein:

FIG. 5 is a sectional diagrammatic view of means for fastening together two half shells of a container according to the invention; and FIG. 6 is a diagrammatic view of a container according to the invention showing dropping and recovery means in a deployed position.

In an embodiment of the device according to the present invention, the container and its cover are made up of a fabric of glass and mat, certain parts subject to greater stresses being reinforced by a high resistance fabric.

Figure 3:
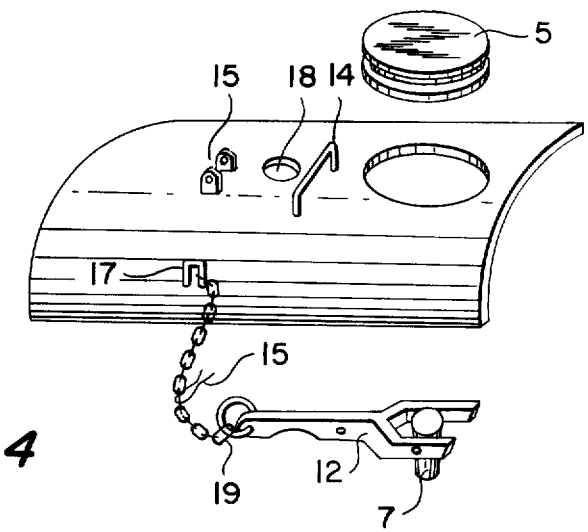
FIG. 3 represents these same means of connection in open position.

As represented, the device comprises two lateral half shells 1 of semicircular section, one of which is solid with a bottom 2, provided with two hooking rings 4 and an opening blocked by a plug 5 (FIG. 3). According to one of the uses of the container, the plug is permeable to a liquid tripping means of inflation of a pneumatic device contained on the inside of said container. For dropping of inert equipment, such as food, medicine, etc., the plug hermetically seals the opening permitting, if desired, the container, otherwise totally sealed, to float. Bottom 2 is reinforced by ribs to serve as a shield at the time of impact and resist the forces of inertia which are transmitted to it by a removable partition 6, placed on bottom 2, on which the load contained inside the body rests. The space made between the shield and removable partition 6 constitutes a housing for various devices, for example, ballast.

A hollow, cylindrical cover 3 is held in place by two pins 7 (FIG. 3), diametrically opposite, each engaged in an orifice 18 made in the wall of each of the half shells and in the side wall of cover 3, perpendicular to the plane of the joint of the half shells. A pin 13 is passed through each of the two arms of a forked member 12 and through pin 7. The ends of the two arms of fork 12 are engaged under a stirrup 14, while its other end, forming a handle, is held between the cheeks of a yoke 15, through whose cheeks passes a safety pin 16 which normally holds the fork handle in place and prevents it from coming up. Stirrup 14 and yoke 15 are solid with the corresponding half shell. Pin 16 is connected to a pull chain 19 one of whose ends is connected to the end of the handle of fork 12 and the other to a small U link 17 also solid with the corresponding half shell. Therefore, all that is required to free the cover and have access to the inside of the container is to disengage the holding pins from the fork handles and lift the latter to obtain an easy and rapid extraction of the locking pins and the freeing of the cover.

Figure 4:
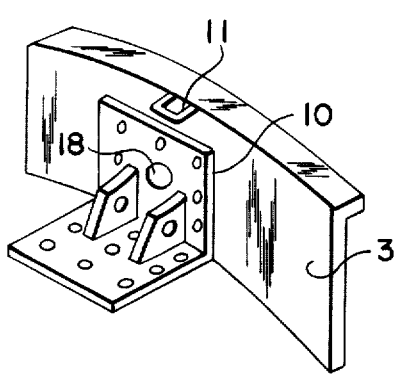
FIG. 4 is a partial diagrammatic view of the inside of the cover.

On the other hand, the inside face of the cover presents a central orifice 8 (FIG. 6) permitting the passage of a floating line. The upper face of the cover is made up of petals 9 of flexible material, which, by bending back, close the housing containing the floating line and other devices such as for dropping and recovery at sea. Each of the petals has an eyelet 20 at its end to permit their assembly by a pin intended to be pulled out at the time of dropping. Finally, the cover has two stirrups 10 and two "U" links 11, diametrically opposite, serving for attachment of the dropping system and a floating line. Deployed dropping means 30 and recovery means 31 are illustrated in FIG. 6. Dropping means 30 comprises a parachute secured to cover 3 by links 11 (FIG. 4). Recovery means 30 comprises two self inflating buoys 32, 33 deployed by extractor chute 34 and secured to the container by means of line 35 which floats in water.

Figure 1:
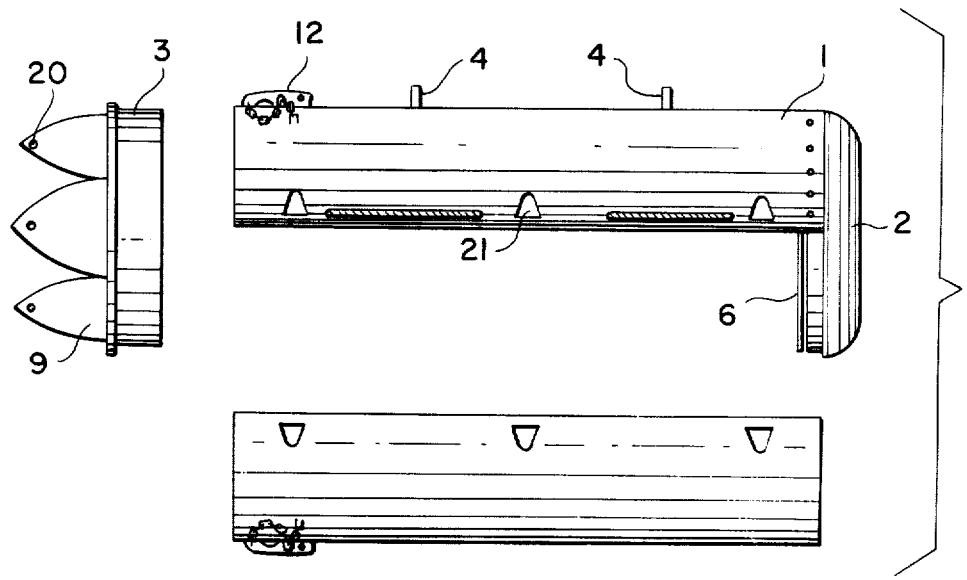
FIG. 1 is an exploded side diagrammatic view of a container according to the invention.
Figure 2:
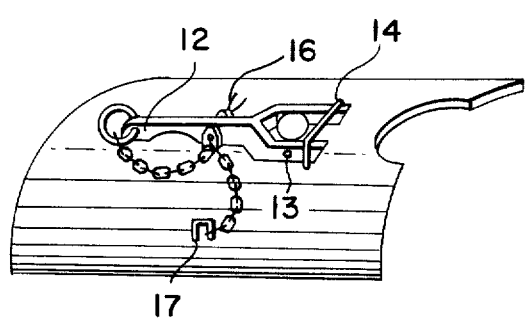
FIG. 2 is a partial diagrammatic view showing the connecting means in locked position of the cover with one of the two half shells.

The two half shells are assembled by standard bolts for dropping of inert equipment. According to another use of the container, the two half shells are assembled by break pin gudgeons which, giving way under the force of a pressure transmitted to the inside wall of said half shells by the inflation of said pneumatic device, permit the automatic disassembly of the latter. Anchoring points 21 (FIG. 1) of these bolts or break pin gudgeons are bosses molded in the mass of the half shells.

A suitable break pin gudgeon is illustrated in FIG. 5. The shell halves 1 are secured together by a bolt 22 extending through flanges 23, 24 integral with the shell halves. The bolt including a mortise portion 25 and a tenon portion 26, secured together by a pin 27. Pin 27 is intended to be sheared under a pre-determined force exerted by the shell halves resulting from the inflation of a pneumatic device, such as a lifeboat, within the container.

The present container can be used in all cases where a pneumatic lifeboat or equipment must be dropped from an aircraft onto the sea or land or from a ship for shipwrecked persons, or from another ship in the case of transfer of equipment. This device can also be used to perform a transfer from a slightly submerged submarine to a surface craft; this latter recovers the container with a diverter float system. Under these conditions, the container can be launched from the submarine by a torpedo tube with a compressed air drive.

What is claimed is:

1. A recoverable container for dropping of equipment from an aircraft or ship, comprising a body made of rigid material comprised of two half shells assembled by removable fastening means, a bottom solid with one of said half shells and a hollow cover engaging hermetically inside of said body and connected by connecting means to at least one of said half shells, said connecting means comprising two pins each placed in an orifice extending through the side wall of each of said half shells and said side wall of said cover, each solid with a fork articulated around a shaft going respectively through the end of each pin, the ends of the two arms of each fork being both placed under a stirrup solid with the corresponding half shell and each of the handles of each of said forks being held between the cheeks of a yoke, which is also solid with the corresponding half shell, by a safety pin provided with a pull chain one of whose ends is fastened to the end of said handle and the other end to a U link solid with said corresponding half shell, at least one of said half shells being provided with an opening closed by a plug.

* * * * *